(12) United States Patent
Tu

(10) Patent No.: US 8,139,156 B2
(45) Date of Patent: Mar. 20, 2012

(54) METHOD AND APPARATUS FOR ADAPTIVE SELECTION OF YC SEPARATION

(75) Inventor: Hsin Chieh Tu, Taipei (TW)

(73) Assignee: Realtek Semiconductor Corp., Hsinchu (TW)

( * ) Notice: Subject to any disclaimer, the term of this patent is extended or adjusted under 35 U.S.C. 154(b) by 782 days.

(21) Appl. No.: 12/267,063

(22) Filed: Nov. 7, 2008

(65) Prior Publication Data
US 2009/0153732 A1 Jun. 18, 2009

(30) Foreign Application Priority Data
Nov. 9, 2007 (TW) ............................... 96142554 A

(51) Int. Cl.
*H04N 9/78* (2006.01)

(52) U.S. Cl. ........................................ 348/667; 348/670

(58) Field of Classification Search ........... 348/663–670
See application file for complete search history.

(56) References Cited

U.S. PATENT DOCUMENTS

| 5,006,927 | A | * | 4/1991 | Creed et al. | .............. | 348/665 |
| 5,016,092 | A | * | 5/1991 | Perlman | .............. | 348/665 |
| 6,288,754 | B1 | | 9/2001 | Ito | | |
| 6,300,985 | B1 | * | 10/2001 | Lowe et al. | .............. | 348/665 |
| 6,377,313 | B1 | * | 4/2002 | Yang et al. | .............. | 348/630 |
| 6,674,488 | B1 | * | 1/2004 | Satoh | .............. | 348/663 |
| 6,833,875 | B1 | * | 12/2004 | Yang et al. | .............. | 348/665 |
| 7,256,838 | B2 | | 8/2007 | Okamoto | | |
| 7,483,037 | B2 | * | 1/2009 | Gies | .............. | 345/589 |
| 7,710,500 | B2 | * | 5/2010 | Byeon et al. | .............. | 348/521 |
| 2006/0110058 | A1 | | 5/2006 | Chao | | |

FOREIGN PATENT DOCUMENTS

| JP | 05-219522 A | 8/1993 |
| TW | 200618643 | 6/2006 |

* cited by examiner

*Primary Examiner* — Victor Kostak
(74) *Attorney, Agent, or Firm* — Thomas, Kayden, Horstemeyer & Risley, LLP

(57) ABSTRACT

A method for adaptive selection of YC separation is provided. While a video decoder is re-sampling, a frequency of a re-sampling signal and a pixel rate of an output signal have a fixed relation, which is used to determine if a sampling frequency of the signal is deviated. And, accordingly, an appropriate Y/C separation is selected and then performed to obtain a better image quality.

24 Claims, 2 Drawing Sheets

METHOD AND APPARATUS FOR ADAPTIVE SELECTION OF YC SEPARATION

This application claims the benefit of the filing date of Taiwan Application Ser. No. 096142554, filed on Nov. 9, 2007, the content of which is incorporated herein by reference.

BACKGROUND OF THE INVENTION

1. Field of the Invention

The invention relates to image processing, and more particularly, to a method and apparatus for adaptive selection of YC separation.

2. Description of the Related Art

When an input composite video signal is received at a television set, a luminance (Y) signal and a chrominance (C) signal need to be separated out. This process is called YC separation. The luminance signal has a bandwidth of 0~5.5 MHz. For PAL-I, the chrominance signal is modulated on a subcarrier frequency of 4.43 MHz and for NTSC the chrominance signal is modulated on a subcarrier frequency of 3.58 MHz.

In general, conventional YC separation is divided into three modes as follows. (1) 1-D YC separation: a filter is used to separate each horizontal scan line into Y signals and C signals. (2) 2-D YC separation: adding/subtracting processing (two-dimension YC separation) is performed on signals based on correlation between scan lines (usually within a field) within a frame. (3) 3-D YC separation: the concept of 3-D YC separation is very similar to that of 2-D YC separation, but the 3-D YC separation is based on correlation between frames.

Based on correlation between pixels transmitted in sequence within a frame, or variation of pixels in the vertical direction and horizontal directions within the frame, conventional YC separation methods are used to design an adaptive separation filter. However, in the case where a sampling frequency of a signal is deviated, conventional adaptive YC separation methods are unable to effectively determine whether the sampling frequency is deviated such that the adaptive separation filter may perform 3-D inter-frame YC separation on the signal, thereby obtaining a poor image quality. Consequently, there are problems in how to effectively determine whether the sampling frequency of the signal is deviated or a sampling point is shifted, and in how to select a suitable YC separation mode if the sampling frequency of the signal is deviated.

SUMMARY OF THE INVENTION

In view of the above-mentioned problems, an object of the invention is to provide a method for YC separation, which selects a more suitable YC separation according to whether sampling frequencies of signals are deviated, thereby obtaining a better image quality.

To achieve the above-mentioned object, the method for YC separation, comprising: obtaining a first frequency value according to a subcarrier frequency of a chrominance signal of an image signal; obtaining a second frequency value according to a synchronizing signal of the image signal; generating a ratio value according to the first frequency value and the second frequency value; determining whether a sampling frequency of the image signal is deviated in order to generate a resultant signal in accordance with the ratio value; and, performing a YC separation on the image signal according to the resultant signal.

Another object of the invention is to provide a YC separator, comprising: a first clock generator for generating a first frequency value according to a subcarrier frequency of a chrominance signal of an image signal, wherein the first frequency value is related to the subcarrier frequency; a second clock generator for generating a second frequency value according to a synchronizing signal of the image signal, wherein the second frequency value is related to the frequency of the synchronizing signal; a detecting module for generating a control signal after determining whether a sampling frequency value of the image signal is deviated according to the first frequency value and the second frequency value; and, a YC separation circuit for performing a YC separation on the image signal, wherein the inter-frame YC-separation of the YC separation circuit is disabled if the control signal is at a first state and the inter-frame YC-separation of the YC separation circuit is enabled if the control signal is at a second state.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

The method and apparatus of adaptive selection for YC separation of the invention will be described with reference to the accompanying drawings.

Figure 1:
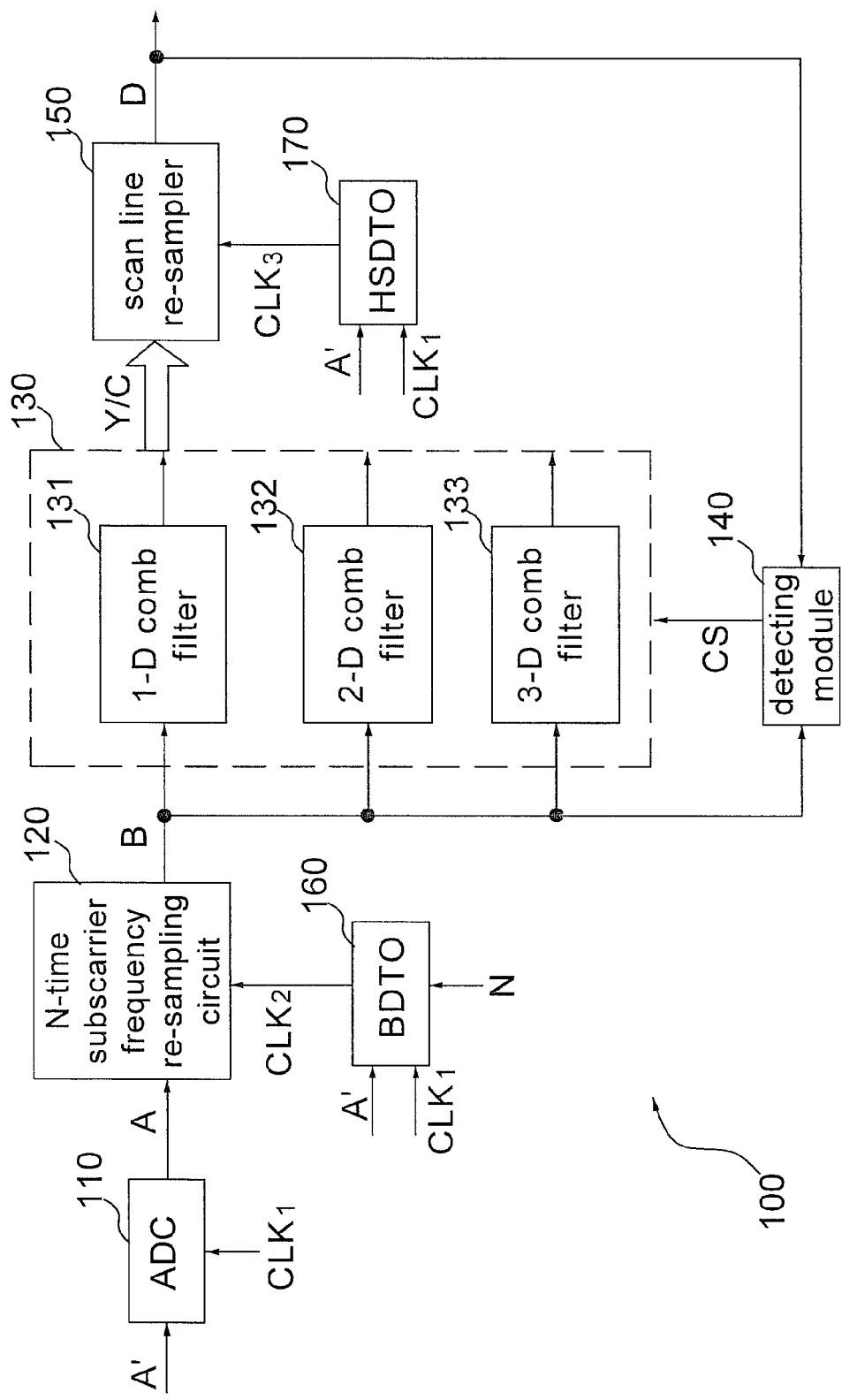
FIG. 1 is a block diagram of a YC separator according to a first embodiment of the invention.

FIG. 1 is a block diagram of a YC separator according to a first embodiment of the invention. Referring to FIG. 1, a video decoder (not shown) shows a following characteristic during re-sampling. N times of a subcarrier frequency $F_{SC}$ of an input analog image signal A' is equal to a frequency $F_B$ of a re-sampling signal B, i.e. $F_B = N \times F_{SC}$. On condition that a signal is sampled correctly (that is, the sampling frequency of the signal is not deviated), a ratio of $F_B$ to $F_D$ will be a constant, where $F_D$ denotes a pixel rate of an output signal D of the video decoder where each horizontal scan line is fed and a YC separation is performed. In the case of PAL-I signals and N=4, the frequency $F_B$ of the re-sampling signal B will be "$4 \times F_{SC} = 4 \times 4.43$ MHz," whereas the pixel rate $F_D$ of the output signal D of the video decoder is related to an output frequency but generally set to 13.5 MHz. Since $F_B$ and $F_D$ are constants, a ratio of these two constants must be a constant ($R_0$) as well.

As shown in FIG. 1, a YC separator 100 is embedded in a video decoder, comprising: an analog-to-digital converter (ADC) 110, a N-time subcarrier frequency re-sampling circuit 120, a YC separation circuit 130, a detecting module 140, a scan line re-sampler 150, a burst discrete time oscillator (BDTO) 160 and a horizontal synchronization discrete time oscillator (HSDTO) 170. Here, the YC separation circuit 130 further includes a 1-D comb filter 131, a 2-D comb filter 132 and a 3-D comb filter 133. Hereinafter, this embodiment of the invention will be described with N=4. It should be understood, however, that the invention is not limited to the particular number described above.

In this embodiment, the YC separator 100 receives an analog composite video signal A' via a connector (e.g., an AV connector) and then transmits the signal A' to the ADC 110. Next, the ADC 110 converts the analog composite video signal A' into a digital composite video signal A according to an operating clock $CLK_1$. In one embodiment, a frequency value of the operating clock $CLK_1$ is 27 MHz. After receiving the analog composite video signal A', the BDTO 160 locks the subcarrier frequency of a chrominance signal C of the analog composite video signal A' to obtain a subcarrier frequency value $F_{SC}$. Then, in the BDTO 160, N (N=4) times of the subcarrier frequency value $F_{SC}$ is divided by its operating frequency value to obtain a frequency value $f_{CLK2}$ (i.e., $f_{CLK2}=(4\times F_{SC})/27M$). Accordingly, the BDTO 160 generates a re-sampling clock $CLK_2$ with a frequency $f_{CLK2}$. Further, the HSDTO 170 also receives the analog composite video signal A' and then locks a frequency of a horizontal synchronizing signal of the analog composite video signal A' to obtain the frequency value $F_{HS}$ of the horizontal synchronizing signal. After dividing the frequency value $F_{HS}$ by its operating frequency value to obtain a frequency $f_{CLK3}$ (i.e., $f_{CLK3}=F_{HS}/27M$), the HSDTO 170 finally generates a re-sampling clock $CLK_3$ with a frequency $f_{CLK3}$. The description stated above merely helps everyone to understand the operations of the BDTO 160 and the HSDTO 170. Since the frequency values of the clocks $CLK_2$ and $CLK_3$ outputted from the BDTO 160 and the HSDTO 170 are known, those skilled in the art may design various clock generators (e.g., a phase-lock loop) to achieve the same functions of the BDTO 160 and the HSDTO 170.

The N-time subcarrier frequency re-sampling circuit 120 receives the digital composite video signal A and then re-samples the digital composite video signal A according to the re-sampling clock $CLK_2$ to produce a re-sampling signal B with N times the subcarrier frequency (i.e., $F_B=4\times F_{SC}$). Assuming that the signal A is sampled correctly and the composite video signal A' is a PAL-I signal, the re-sampling signal B has a frequency of "$4\times F_{SC}=4\times 4.43$ MHz." Contrarily, if the sampling frequency of the signal A is deviated, the frequency of the re-sampling signal B will vary with the subcarrier frequency $F_{SC}$ locked by the BDTO 160 in the same direction. On the other hand, according to image characteristics, the scan line re-sampler 150 selectively receives Y signals and C signals outputted from at least one of three filters 131, 132 and 133. Next, according to the re-sampling clock $CLK_3$, the scan line re-sampler 150 re-samples the Y, C signals and then arranges the re-sampled signals in a horizontal scan line to generate an output signal D. Here, the output signal D is in the format of "YCrYCbYCrYCb . . . " On average, each pixel has a Y component and a C (Cr or Cb) component, but pairs of two pixels share common Cr and Cb components. If the Y, C signals are sampled correctly, the pixel rate of the output signal D is at 13.5 MHz. On the contrary, if the sampling frequency of the Y, C signals are deviated, the pixel rate of the output signal D will vary with the frequency $F_{HS}$ of the horizontal synchronizing signal locked by the HSDTO 170 in the same direction.

In general, each frame includes an even field and an odd field. In this embodiment, assuming that theoretical constant $R_0=(4\times 4.43)/13.5=1.31$ and a pre-defined range covers 1.275 to 1.346, the detecting module 140 is employed to sample the frequency $F_B$ of the signal B and the pixel rate $F_D$ of the output signal D several times (e.g., five times) for each field (including the even field and the odd field) and accumulate a total number of sampling times up to a predetermined number (e.g., 100 times) to increase the sample size, thereby increasing the accuracy of judgment. Each time after sampling, the detecting module 140 calculates a ratio value R ($=F_B/F_D$) and then determines whether the ratio value R falls within the pre-defined range to respectively accumulates both a number T1 of times that the ratio value R falls within the pre-defined range and a number T2 of times that the ratio value R falls out of the pre-defined range (i.e., to vote by ballot). If the total number of sampling times is accumulated up to a threshold value and the number T2 is greater than the number T1, the detecting module 140 will determine that the sampling frequency is deviated. Since whether the sampling frequency is deviated is determined by ballot, it can cause time delay but present a relatively stable image.

On condition that the sampling frequency of the signal is deviated, after each horizontal scan line is sampled, the number of sampling points will be greater or less than a standard value, thereby causing a shift in position of sampling points. While performing 3-D YC separation, the YC separation circuit 130 needs to compare all sampling points between two consecutive frames (i.e., inter-frame YC separation). If there is a shift in position of the sampling points, inaccurate luminance values and chrominance values will be obtained and a poor image quality will be created since the 3-D YC separation is performed by using sampling points in wrong position. Thus, if it is determined that the sampling frequency of the signal is deviated, the detecting module 140 will set a control signal CS into a first state (e.g., a logically low state). That will restrict the YC separation circuit 130 to enable at least one of the 1-D comb filter 131 and the 2-D comb filter 132 to perform an intra-frame YC separation on the incorrectly sampled signal B for a better image quality. In other words, the scan line re-sampler 150 is only allowed to receive the Y signals and the C signals outputted from at least one of these two filters 131 and 132. On the other hand, if T2<T1, it indicates that the sampling frequency of the signal is not deviated and the signal is sampled correctly, so the detecting module 140 will set the control signal CS into a second state (e.g., a logically high state). That allows the YC separation circuit 130 to freely enable at least one of the filters 131, 132 and 132 to perform an intra-frame YC separation or an inter-frame YC separation. In other words, the scan line re-sampler 150 can selectively receive the Y signals and the C signals outputted from at least one of the three filters 131, 132 and 133 according to image characteristics.

Figure 2:
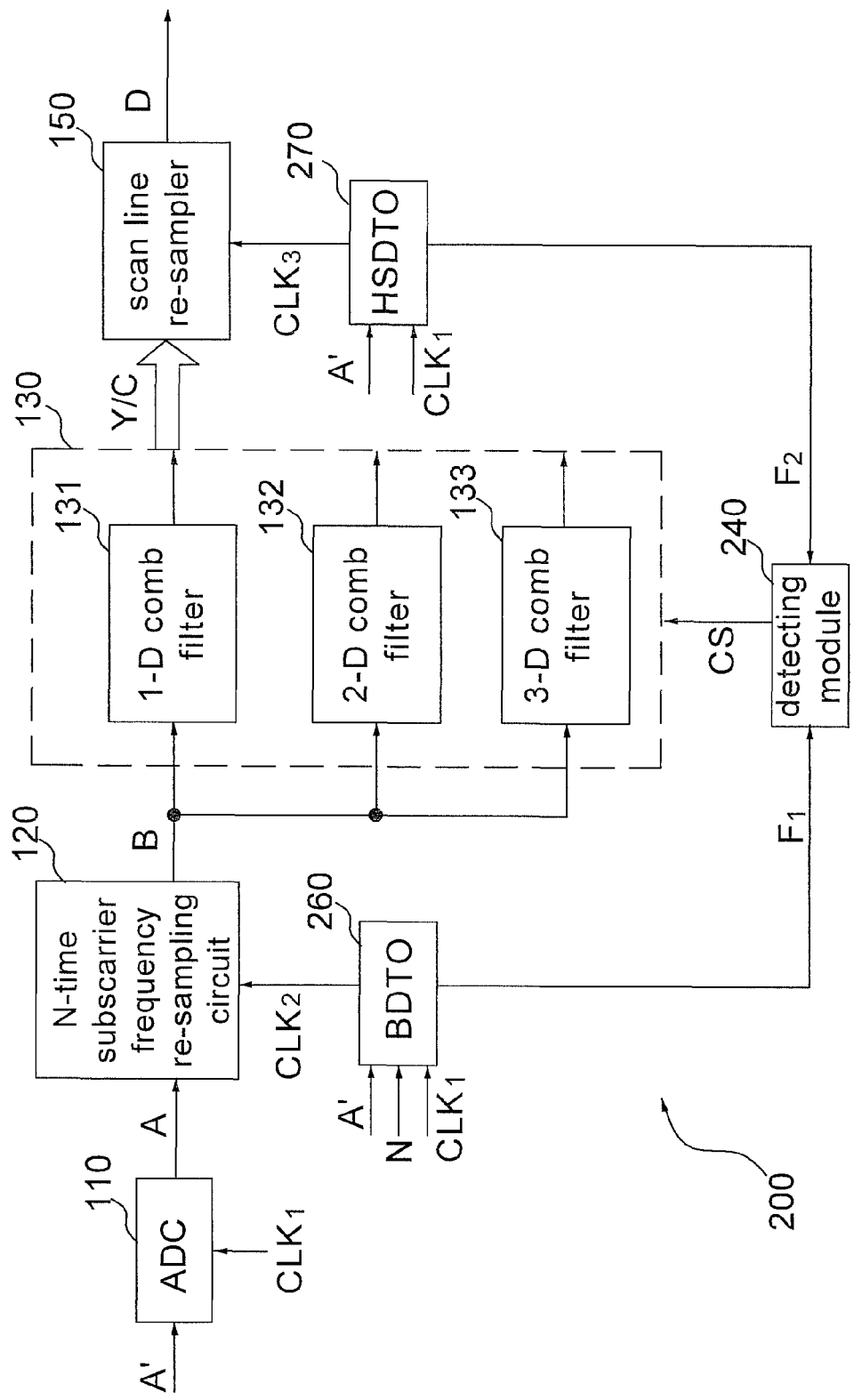
FIG. 2 is a block diagram of a YC separator according to a second embodiment of the invention.

FIG. 2 is a block diagram of a YC separator according to a second embodiment of the invention. The second embodiment and the first embodiment differ on operations of a detecting module 240, a BDTO 260 and a HSDTO 270. The difference between two embodiments will be described as follows.

In addition to generating the re-sampling clock $CLK_2$ with a frequency of $f_{CLK2}$, the BDTO 260 outputs the frequency value $f_{CLK2}$ as an output frequency value $F_1$. Likewise, In addition to generating the re-sampling clock $CLK_3$ with a frequency of $f_{CLK3}$, the HSDTO 270 outputs the frequency value $f_{CLK3}$ as an output frequency value $F_2$. In a case of correctly sampling, the frequency value $F_1$ outputted from the BDTO 260 will be "$4\times 4.43/27$" and the frequency value $F_2$ outputted from the HSDTO 270 will be "$13.5/27$." As a result, $F_1/F_2=f_{CLK2}/f_{CLK3}=((4\times 4.43)/13.50)=F_B/F_D=R=R_0$ (i.e., 1.31). Thus, the detecting module 240 calculates the ratio value R according to $F_1$, $F_2$ and then compares the ratio value R with the theoretical constant $R_0$. By means of voting by ballot as used in the first embodiment, the detecting module 240 determines whether the sampling frequency of the signal is deviated and then sets the control signal into its respective state. If the sampling frequency of the signal is deviated, it may show a state of a deviated subcarrier frequency $F_{SC}$ or/and a deviated frequency $F_{HS}$ of a horizontal synchronizing signal. Accordingly, the frequency values $F_B$, $F_D$, $F_1$, $F_2$ will not equal the normal values stated above, causing the ratio values ($F_B/F_D$) and ($F_1/F_2$) to deviate from the theoretical constant $R_0$.

As can be observed, it is the subcarrier frequency $F_{SC}$ and the frequency $F_{HS}$ of a horizontal synchronizing signal that cause the ratio values ($F_B/F_D$) and ($F_1/F_2$) to deviate from the theoretical constant $R_0$. Thus, in an alternative embodiment, in addition to generating the re-sampling clock $CLK_2$ with a frequency of $f_{CLK2}$ (i.e., $(4 \times F_{SC})/27M$), the BDTO 260 directly outputs a locked subcarrier frequency value $F_{SC}$ as the output frequency value $F_1$ (not shown). Likewise, In addition to generating the re-sampling clock $CLK_3$ with a frequency of $f_{CLK3}$ (i.e., $F_{HS}/27M$), the HSDTO 270 directly outputs a locked frequency $F_{HS}$ of the horizontal synchronizing signal as the output frequency value $F_2$. At this moment, the detecting module 240 calculates a ratio value R' according to $F_1$, $F_2$ and compares the ratio value R' with a theoretical constant $R'_0$ to determine whether the sampling frequency of the signal is deviated. Here, $R'=F_1/F_2=F_{SC}/F_{HS}$; meanwhile, the theoretical constant $R'_0$ is adjusted to "4.43M/13.5M" and has a suitable pre-defined range. Thus, each time after receiving the frequency values $F_1$, $F_2$, the detecting module 240 calculates the ratio value R' (i.e., $R'=F_1/F_2=F_{SC}/F_{HS}$) and then determines whether the sampling frequency of the signal is deviated by means of voting by ballot as used in the first embodiment.

It should be noted that the detecting modules 140, 240 can be implemented by at least one of hardware, firmware and a combination of hardware and firmware. In addition, the horizontal synchronizing signal can be substituted by other synchronizing signals; for example, a cycle of a data enable signal is in relation with that of the horizontal synchronizing signal, a cycle of a vertical synchronizing signal is a multiple of that of the horizontal synchronizing signal, or a pixel clock can be used to generate a frequency value substantially related to the cycle of the horizontal synchronizing signal.

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those ordinarily skilled in the art.

What is claimed is:

1. A method for YC separation, comprising:
    obtaining a first frequency value according to a subcarrier frequency of a chrominance signal of an image signal;
    obtaining a second frequency value according to a synchronizing signal of the image signal;
    generating a ratio value according to the first frequency value and the second frequency value;
    determining whether a sampling frequency of the image signal is deviated in order to generate a resultant signal in accordance with the ratio value; and
    performing a YC separation on the image signal according to the resultant signal.

2. The method according to claim 1, wherein the YC separation is one of an inter-frame YC separation and an intra-frame YC separation.

3. The method according to claim 1, wherein the synchronization signal of the image signal is a horizontal synchronizing signal.

4. The method according to claim 2, wherein the step of determining comprises:
    making a plurality of comparisons between the ratio value and a pre-defined range in at least one field to obtain a first accumulated number that the sampling frequency of the image signal is deviated and a second accumulated number that the sampling frequency of the image signal is not deviated; and
    determining whether the sampling frequency of the image signal is deviated according to the first accumulated number and the second accumulated number.

5. The method according to claim 4, wherein the inter-frame YC-separation is disabled if the sampling frequency of the image signal is deviated.

6. The method according to claim 4, wherein only the intra-frame YC-separation is allowed to perform on the image signal if the sampling frequency of the image signal is deviated.

7. The method according to claim 2, wherein the inter-frame YC-separation is enabled if the sampling frequency of the image signal is not deviated.

8. The method according to claim 1, wherein the step of obtaining the first frequency value comprises:
    obtaining the first frequency value according to the subcarrier frequency, a multiple N and an operating frequency value.

9. The method according to claim 6, wherein the intra-frame YC separation is one of a 1-D comb filtering, a 2-D comb filtering and a combination operation involving both.

10. A YC separator, comprising:
    a first clock generator for generating a first frequency value according to a subcarrier frequency of a chrominance signal of an image signal, wherein the first frequency value is related to the subcarrier frequency;
    a second clock generator for generating a second frequency value according to a synchronizing signal of the image signal, wherein the second frequency value is related to the frequency of the synchronizing signal;
    a detecting module for generating a control signal after determining whether a sampling frequency value of the image signal is deviated according to the first frequency value and the second frequency value; and
    a YC separation circuit for performing a YC separation on the image signal, wherein the inter-frame YC-separation of the YC separation circuit is disabled if the control signal is at a first state and the inter-frame YC-separation of the YC separation circuit is enabled if the control signal is at a second state.

11. The YC separator according to claim 10, wherein the first frequency value is equal to the subcarrier frequency multiplied by a multiple N and divided by an operating frequency value.

12. The YC separator according to claim 10, wherein the synchronizing signal is a horizontal synchronizing signal and the second frequency value is equal to a frequency value of the horizontal synchronizing signal divided by an operating frequency value.

13. The YC separator according to claim 10, wherein the YC separation circuit comprises an inter-frame YC separation circuit and an intra-frame YC separation circuit.

14. The YC separator according to claim 10, wherein the detecting module makes a plurality of judgments for each of at least one field, and wherein the detecting module sets the control signal into the first state if a total number of judgments is equal to a threshold value and a first accumulated number that the sampling frequency of the image signal is deviated is greater than a second accumulated number that the sampling frequency of the image signal is not deviated.

15. The YC separator according to claim 10, further comprising:
   an analog to digital converter coupled to the first clock generator for performing an analog to digital conversion on the image signal according to a third clock.

16. The YC separator according to claim 10, wherein the detecting module is implemented by at least one of hardware, firmware and a combination of hardware and firmware.

17. The YC separator according to claim 14, wherein the judgments are comparisons between a ratio value and a predefined range and the ratio value is a ratio of the first frequency value to the second frequency value.

18. A YC separator, comprising:
   a first re-sampling circuit for re-sampling a digital image signal according to a first clock and generating a re-sampling signal;
   a YC separation circuit for performing a YC separation on the re-sampling signal according to a control signal and generating a Y signal and a C signal, wherein an inter-frame YC-separation of the YC separation circuit is disabled if the control signal is at a first state and the inter-frame YC-separation of the YC separation circuit is enabled if the control signal is at a second state;
   a second re-sampling circuit for re-sampling the Y signal and the C signal according to a second clock and generating an output signal; and
   a detecting module for generating the control signal after determining whether a sampling frequency value of the digital image signal is deviated according to the re-sampling signal and the output signal.

19. The YC separator according to claim 18, further comprising:
   an analog to digital converter coupled to the first re-sampling circuit for performing an analog to digital conversion on an analog image signal according to a third clock and generating the digital image signal;
   a first clock generator for generating a first clock according to a subcarrier frequency of a chrominance signal of the analog image signal; and
   a second clock generator for generating a second clock according to a synchronizing signal of the analog image signal.

20. The YC separator according to claim 18, wherein the YC separation circuit comprises an inter-frame YC separation circuit and an intra-frame YC separation circuit.

21. The YC separator according to claim 19, wherein a frequency value of the first clock is equal to the subcarrier frequency multiplied by a multiple N and divided by an operating frequency value.

22. The YC separator according to claim 18, wherein the detecting module makes a plurality of judgments for each of at least one field, and wherein the detecting module sets the control signal into the first state if a total number of judgments is equal to a threshold value and a first accumulated number that the sampling frequency of the image signal is deviated is greater than a second accumulated number that the sampling frequency of the image signal is not deviated.

23. The YC separator according to claim 22, wherein the judgments are comparisons between a ratio value and a predefined range and the ratio value is a ratio of a frequency value of the re-sampling signal to a frequency value of the output signal.

24. The YC separator according to claim 18, wherein the detecting module is implemented by at least one of hardware, firmware and a combination of hardware and firmware.

* * * * *